US006882347B2

(12) United States Patent
Williams

(10) Patent No.: US 6,882,347 B2
(45) Date of Patent: Apr. 19, 2005

(54) TEXTURE GENERATING APPARATUS FOR DYNAMIC INTERFERENCE CHECKING

(75) Inventor: Ian M. Williams, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 09/727,985

(22) Filed: Nov. 30, 2000

(65) Prior Publication Data

US 2002/0063720 A1 May 30, 2002

(51) Int. Cl.$^7$ ................................................. G09G 5/00
(52) U.S. Cl. ...................................................... 345/582
(58) Field of Search ........................... 345/582; 706/919

(56) References Cited

U.S. PATENT DOCUMENTS

| 5,444,838 | A | | 8/1995 | Kommrusch et al. ....... 345/441 |
| 6,167,151 | A | * | 12/2000 | Albeck et al. .............. 382/154 |
| 6,415,050 | B1 | * | 7/2002 | Stegmann et al. .......... 382/154 |
| 6,452,604 | B1 | * | 9/2002 | Sato ........................... 345/619 |
| 6,594,391 | B1 | * | 7/2003 | Quadranti et al. .......... 382/203 |
| 6,629,065 | B1 | * | 9/2003 | Gadh et al. ..................... 703/1 |

OTHER PUBLICATIONS

*OpenGL Programming Guide*, 3$^{rd}$ Ed., Addison Wesley Publishing Co. (ISBN 0–201–60458–2), Chapter 9—"Texture Mapping".

* cited by examiner

*Primary Examiner*—Michael Razavi
*Assistant Examiner*—Motilewa Good-Johnson
(74) *Attorney, Agent, or Firm*—Woodcock Washburn LLP

(57) ABSTRACT

The present invention provides an apparatus, system, and method for performing interference checking of the design in a project, component or part thereof to a designer, engineer, team of designers, or a team of engineers. In one embodiment, the present invention is comprised of a texture generating apparatus adapted to provide proximity analysis of objects in a design by dynamically generating a texture visually indicative of the spatial relationship between the modeled objects. In this embodiment, the texture generating apparatus is further comprised of a processing element. The processing element is adapted to perform the calculations of the interference check. The texture generating apparatus is further comprising a texture generating element. The texture generating element is adapted to provide the texture on which the interference check is based. The texture generating apparatus is further comprised a rendering element. The rendering element is adapted to provide the rendering of the texture onto the object in a design.

11 Claims, 11 Drawing Sheets

Solid Color Texture

500

| 501 | 10 | 9 | 8 | 7 | 6 | 5 | 4 | 3 | 2 | 1 | Distance in mm's |
|---|---|---|---|---|---|---|---|---|---|---|---|
| 502 | 1 | 2 | 8 | 4 | 5 | 6 | 7 | 8 | 9 | 10 | Intensity of colored texture |

TEXTURE GENERATING APPARATUS FOR DYNAMIC INTERFERENCE CHECKING

FIELD OF THE INVENTION

The present invention relates to computer aided design. More specifically the present invention enables a designer or team of designers to perform dynamic interference checking of objects, or envelopes or bounding boxes which represent the object(s), in a design, while at their respective workstations.

BACKGROUND OF THE INVENTION

With the continuing development of computer technology regarding computer graphics, there has been a steady increase in the dependency of designers, engineers, and manufacturers to implement and use CAD (computer aided design) and/or CAM (computer aided manufacturing) systems for assistance in the designing of new projects and in the redesigning of existing projects or processes that have been determined to contain flaws. Many facets of the design process that were once done by hand are now readily accomplished with the aid of computer and graphic systems. In addition, with the increase in computing power and the improved graphical representation of an object, many of the more intricate and elaborate graphical processing tasks are now being accomplished through the utilization of a CAD graphic system.

A CAD or CAM graphic system enables a designer or engineer to develop, design, manipulate, and/or modify any project, a component of the project, or a part of that component. To enable the designer, rendered graphical representations of the components, parts of the components, or entire projects are displayed on a computer video display monitor. These graphic images, which have continually improved from a primitive type of connect-the-dots appearance to that of an almost photographic image, can be presented in two dimensional form, as lines, circles or polygons, or in a three dimensional form as polyhedra, which are sets of polygons. Regardless of the dimensional point of view, all graphics are based on a geometric coordinate system.

In many design situations, specifically when the situation encompasses the development of a large project; for example, an automobile or an airplane, typically, many designers or teams of designers are involved. Each designer or team is usually assigned a portion of the project, or a specific component or sub-assembly of the project. Using the automobile as an example, while one designer, team of designers, an engineer, or team of engineers may be assigned to work on the front brake assembly, another designer or team of designers, etc., may be assigned to work on the front shock absorber assembly, while yet another designer or team of designers, etc., might be assigned to work on the steering assembly.

One of the many critical aspects of designing any project, component, part of that component, or sub-assembly is the necessity to continually examine for an interference in the physical design structure or in the placement of a project's components. Interferences may be examined via a visually displayed graphical representation or by tabular data or other appropriate means to depict interferences calculated via computational methods from geometric representations. The term "interference", in and of the disclosure of the present invention, can refer not only to the physical proximity of one component, or part of that component, with regard to a second component, or part thereof, wherein that first component either comes into physical contact with the second component and the first component's function is inhibited or restricted, or restricts or inhibits the function or motion of that second component, or part of that second component, but can also refer to the electrical and/or magnetic and/or noise and/or heat or other such field of a project, component, sub-assembly or part thereof that is in conflict with other electrical and/or magnetic and/or noise and/or heat or other such fields present in a project, component, sub-assembly or part thereof. Therefore, this continual process of examination, commonly referred to as "interference checking", involves a designer, a team of designers, an engineer, or a team of engineers closely observing the interaction among all the designed components or sub-assemblies of the larger overall project and checking for the interferences, whether physical, magnetic, electrical, and/or noise and/or heat or other such fields between any of the involved components or sub-assemblies.

After the designer or team of designers had completed their respective assignments, for example, the steering assembly, the brake assembly, or the shock absorber assembly, the designer or team thereof would then forward their finished work to a central project database, termed a project library or project tree, which could, in this example, contain only those components related to the front end of the exampled automobile. Depending on the overall size of the project, the project library/tree could contain other separate sub-sections or it may contain all of the components contained within the design of the entire automobile. Once the designs had been forwarded to the project library/tree, another team of designers would then perform a barrage of interference checks on the library of project components. In this example, they would check for interferences regarding the interrelationship between the now combined braking, steering, and shock absorbing assemblies, assuring that no component restricts or inhibits the other from performing their respective function, either physically, magnetically, electrically, and/or noise and/or heat or other such interferences.

While these interference checks were being accomplished by the other team, the original designer or team of designers would then move forward to another task while waiting for the results of the interference checks. Perhaps, the next part of the original designer's project was, in part, a continuation of, or a sub-assembly of, the first design recently submitted. If the interference checking produced a unsatisfactory result, the designed component would be returned to the original designer or team for reworking. Depending on the time taken by the interference checking team to complete their task, and also depending on the amount of reworking, redesigning, or reconfiguration of the original component that might be required, some or all of the progress made on the second portion, or any related component, might then have to be discarded or redesigned, and begun anew after the redesigning of the first component has been completed. This is a most inefficient way to provide interference checking which could increase the time required for project completion and the total cost of the project.

More recently, interference checking on projects, assemblies, components, or parts thereof, within most engineering applications has been typically implemented as a function that is performed at certain points within the design process. This may be on a relatively small number of components that might take a few minutes or on complete assemblies that may take hours or even days to complete. To further reduce the processing time necessary to check completed assemblies, interference checking is often performed in a hierarchical manner. This means that when certain subassemblies are completed or combined with other assemblies or subassemblies, for example the shock absorber assembly being combined with the brake assembly, an interference check is performed, which, typically, is still completed after the assembly or sub-assembly is sent to the project library/tree for an assigned team of engineers to perform the interference check.

Although this approach divides the overall project into smaller amounts, this approach still requires the component, part thereof, or subassembly to be forwarded to the project library/tree where there it is subjected to the process of interference checking. While the overall size of each of the interference check processes has been reduced which accelerates the checking process, this approach increases the frequency of interference checking which is still quite disruptive to the design flow of the project. Additionally, interference checking, while being performed more frequently and on smaller portions of the project, is still typically based upon the geometry defining a component, and as such still requires complex mathematical computations to complete the interference check. As a consequence, it still has a disruptive effect on the design work flow and could, as such, become a chore and less likely to be performed as often as preferred.

A further drawback to the prior existing methods of performing the interference checking, is that to perform the required mathematical calculations related to the interference checks, whether being implemented in a desktop workstation or in a large mainframe, the CPU is typically utilized to complete the geometric calculations, which, depending on the size of the project, may take considerable processing power and time to finish. While performing those computations, the processor is preemptively occupied, meaning that only the most rudimentary tasks, if any, will be performed by the CPU while it is performing the computationally intensive calculations required for the interference checking. In addition, because the interference check is a mathematical calculation, dynamic graphics to visually assist in the comprehension of the interferences can only be used after the interferences have been calculated.

In a different approach to solving the problem of interference checking, a polygon cap technique is implemented, as shown in U.S. Pat. No. 5,444,838, entitled COMPUTER SYSTEM AND METHOD FOR INTERFERENCE CHECKING OF POLYHEDRA USING CAPPING POLYGONS, to Kommrusch et al., Date of Patent; Aug. 22, 1995 which describes a process for interference checking that involves an object or a component in question, shown as a polyhedra (plural of polyhedron), referenced by a sectioning plane, and when contacted by the plane, cut and then capped, which is stored in a cap list. Once all polyhedra, which, theoretically, could be in the thousands, has been capped and listed, then all the caps are checked against the other polygons for interferences.

While this approach somewhat alleviates the work flow disturbance of not having to forward the portion to a project library/tree where a team of engineers is assigned to perform interference checking, this method does require the designer, or team thereof, to cease the designing process and begin the tedious task of manually entering the related multitudinous polyhedra information into their workstation, which then performs the necessary calculations. Consequently, the designer is still required to pause/cease designing, manually enter the geometric information related to the object in question, and wait for the computer to complete the interference check is being performed. By requiring the designer to pause and enter the information manually, no real time saving or labor saving advantage is achieved using this approach. In fact, because of the labor required by the designer to manually enter the required information, and then to have to wait for the workstation to perform the necessary calculations, this approach may actually inhibit the design process, and might reduce the number of interference checks that the designer, or team thereof, would and should perform.

Today, however, as computers have become more powerful, designers and engineers are trying to do more "design-in-context". The designer or team of designers, etc., would, as previously described, utilize a CAD system for assistance in the design of a component and, in addition, the designer or team of designers, etc., would further utilize the CAD system by concerning themselves not only with their assigned portion, component, or sub-assembly, but also they would be concerned with their particular component or subassembly and how the relationship of their component is relevant to the components around it and with respect to the overall structure of the entire assembly or project. Hence, "design-in-context" is with respect of and relative to the entire project.

Thus exists a need for an apparatus, system, and method to provide to an individual designer, engineer, or team of designers or engineers the ability to perform an interference check of a design of a project, component, or part thereof while the individual is disposed at their workstation. Additionally, another need exists for an apparatus, system, and method for performing the interference checking calculations separate of the workstation's CPU. An additional need exists for an apparatus, system, and method for performing the interference check, seamlessly and effortlessly, as part of the "overhead" or total work flow of the design process. A further need exists for an apparatus, system, and method for dynamically displaying a textured representation of the object in a design project, component, or part contained therein, with respect to the overall "design in context" of the entire project, component, or portion thereof.

SUMMARY OF THE INVENTION

The present invention provides an apparatus, system, and method to provide to an individual designer, engineer, or team of designers or engineers the ability to perform an interference check of an object in a design of a project, component, or part thereof while the individual is disposed at their workstation. Additionally, the present invention provides an apparatus, system, and method for performing the interference checking calculations separate of the workstation's CPU. The present invention further provides an apparatus, system, and method for performing the interference check, seamlessly and effortlessly, as part of the "overhead" or total work flow of the design process. The present invention further provides an apparatus, system, and method for dynamically displaying a texture representative of the spatial relationship between the objects in a design project, component, or part contained therein, with respect to the overall "design in context" of the entire project, or portion thereof.

The present invention provides an apparatus, system, and method for performing interference checking of the design in a project, component or part thereof to a designer, engineer, team of designers, or a team of engineers. In one embodiment, the present invention is comprised of a texture generating apparatus. In this embodiment, the texture generating apparatus is further comprised of a processing element. The processing element is adapted to perform the calculations of the interference check. The texture generating apparatus is further comprising a texture generating element. The texture generating element is adapted to provide the texture on which the interference check is based. The texture generating apparatus is further comprised a rendering element. The rendering element is adapted to provide the rendering of the texture onto the object in a design.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

A texture based dynamic interference checker is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "indicating" or "indexing" or "receiving" or "performing" or "initiating" or "sending" or "implementing" or "disabling" or "enabling" or "displaying" or the like, refer to the action and processes of a computer graphic system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in the context of a computer graphic system, such as those implemented in a CAD (computer aided design) or CAM (computer aided manufacturing) environment. However, it is appreciated that the present invention can be used with other types of computer graphic systems that have the capability to render, display, and manipulate graphical images in one, two, or three dimensions.

Figure 1:
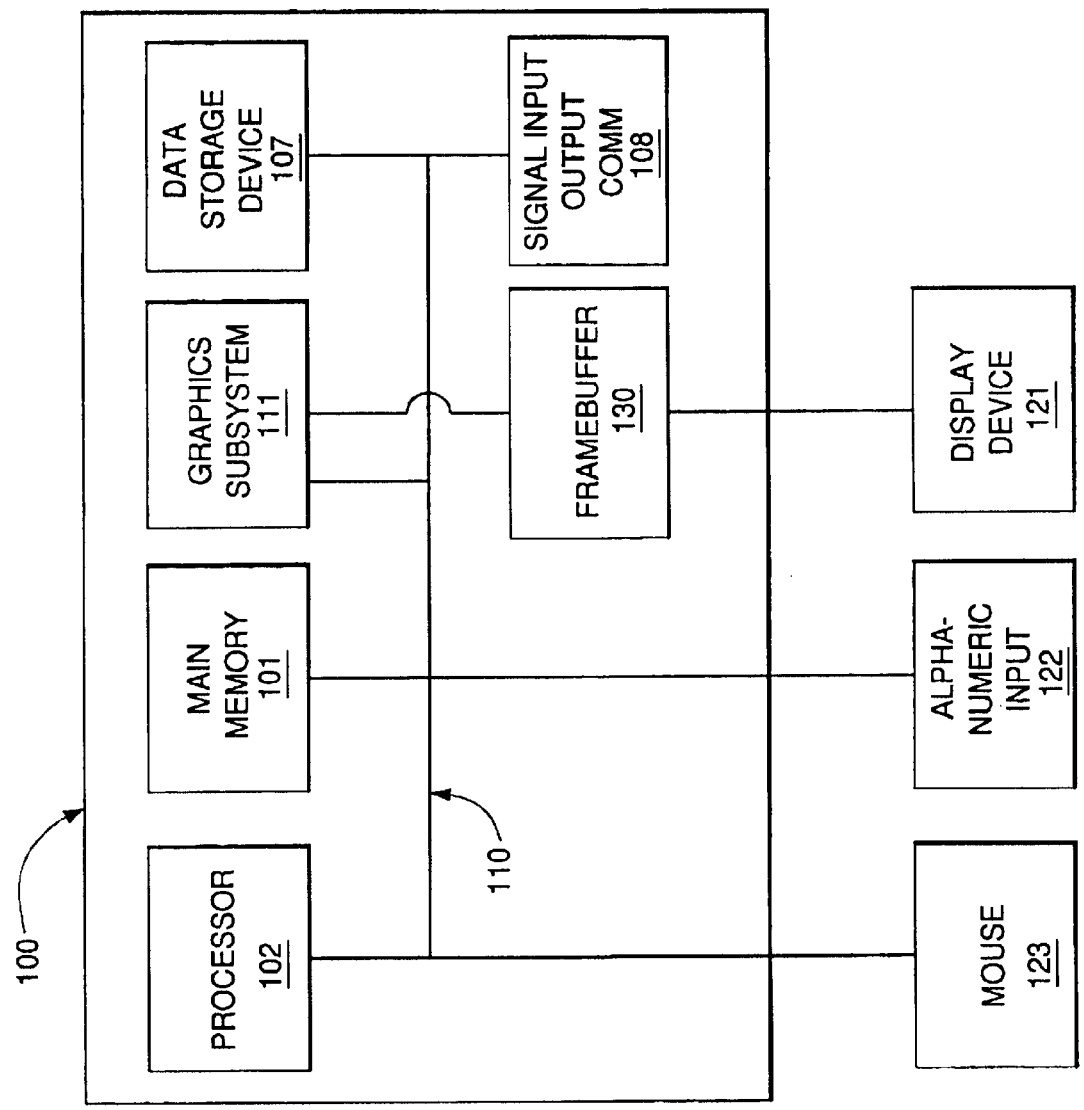
FIG. 1 is a block diagram of a computer system for performing graphics design calculations in accordance with one embodiment of the present invention.

FIG. 1 is a block diagram of graphics computer system 100 upon which the present embodiment of the present invention can be implemented. Computer system 100 exemplifies a computer-controlled graphics systems for generating complex or three-dimensional images.

Computer system 100 comprises a bus or other communication means 110 for communicating information, and a processor 102 coupled with bus 110 for processing information. Computer system 100 further comprises a random access memory (RAM) or other dynamic storage device 104 (main memory 104) coupled to bus 110 for storing information and instructions to be executed by processor 102. Main memory 104 also may be used for storing temporary variables or other intermediate information during execution of instructions by processor 102. Data storage device 107 is coupled to bus 110 and is used for storing information and instructions. Furthermore, signal input/output (I/O) communication device 108 is used to couple computer system 100 onto, for example, a network.

Additionally coupled to computer system 100's bus 110 through an intermediary device (not shown), such as, e.g., a USB (universal serial bus) port, a serial (RS-232) port, a P/S2 port, a keyboard (5 pin DIN) receptacle, or in the case of a wireless input device, an IR (infra-red) port, can be an alphanumeric input device 122, including alphanumeric and other keys, which is used for communicating information and command selections to processor 102. Another type of user input device which can be coupled to computer system 100 analogous to the coupling of alphanumeric input device is mouse 123 (or a like device such as a trackball or cursor direction keys) which is used for communicating direction information and command selections to processor 102 and for controlling cursor movement on display device 121. This input device typically has two degrees of freedom in two axes, a first axis (e.g., x) and a second axis (e.g., y), which allows the device to specify positions in a plane.

In accordance with the present invention, also coupled to bus 110 is graphics subsystem 111. Processor 102 provides graphics subsystem 111 with graphics data such as drawing commands, coordinate vertex data, and other data related to an object's geometric position, color, and surface parameters. In general, graphics subsystem 111 processes the graphical data, converts the graphical data into a screen coordinate system, generates pixel data (e.g., color, shading, texture) based on the primitives (e.g., points, lines, polygons, and meshes), and performs blending, anti-aliasing, and other functions. The resulting data are stored in framebuffer 130. A display subsystem (not shown) reads framebuffer 130 and displays the image on display device 121.

Figure 2:
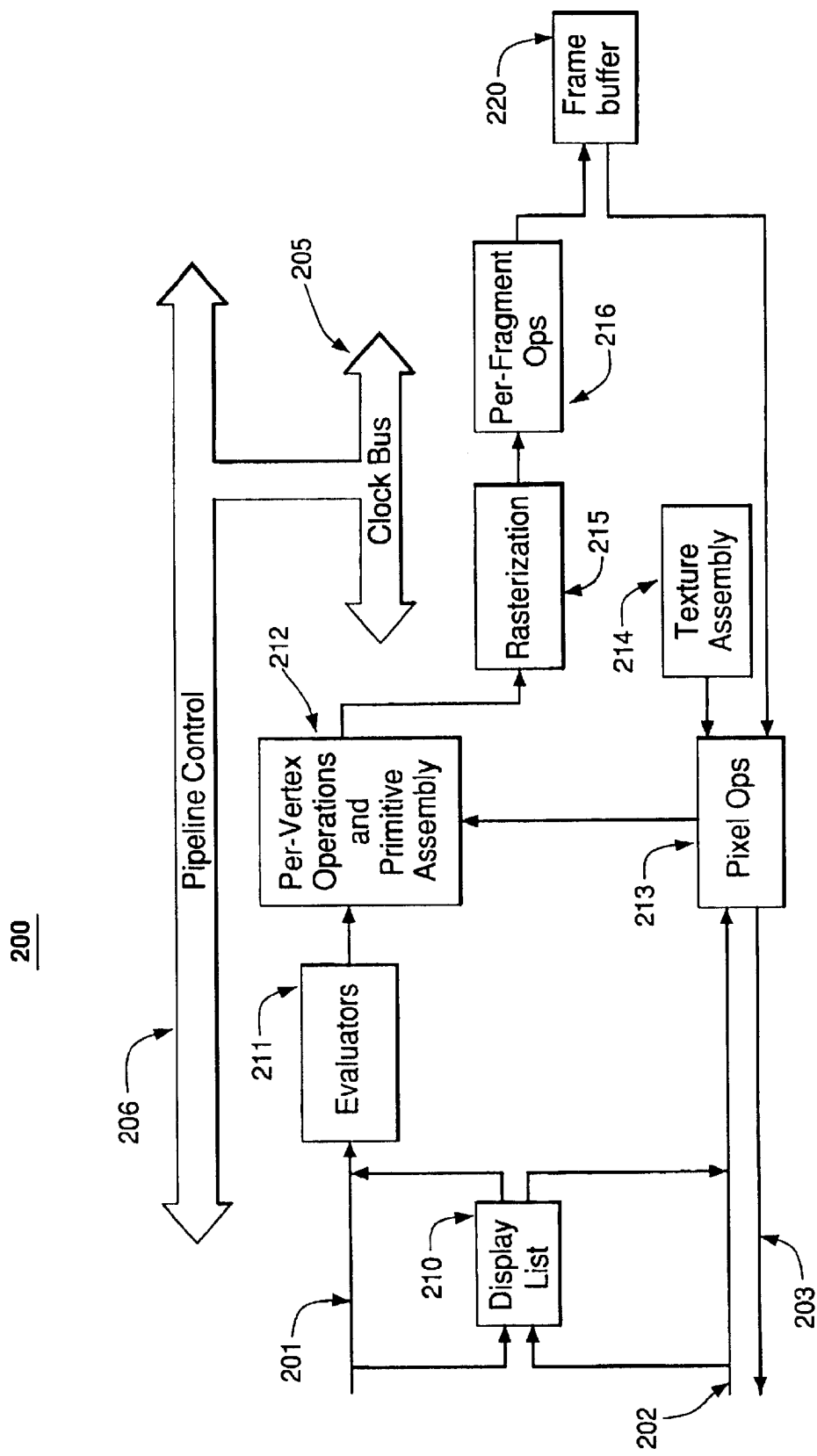
FIG. 2 shows a diagram of an Open GL graphics pipeline in accordance with one embodiment of the present invention.

With reference now to FIG. 2, a diagram of a more complex embodiment of a graphics subsystem 200, depicted as graphics subsystem 111 in FIG. 1, in accordance with one embodiment of the present invention is shown. Graphics subsystem 200 shows the functional components of an exemplary Open GL graphics subsystem.

As depicted in FIG. 2, graphics subsystem 200 includes a first and second instruction buss 201 and 202 coupled to a display list memory 210, evaluators 211, and pixel operations unit 213. The evaluators 211 are coupled to a per-vertex and primitive assembly unit 212. The pixel operations unit is coupled to a frame buffer 220 and a texture assembly unit 214. The output of the pixel operations unit is coupled to a rasterization unit 215. The output of the per-vertex and primitive assembly unit is also coupled to the rasterization unit 215, which is in turn, coupled to a per-fragment operations unit 216. The output of the per-fragment operations unit is coupled to the frame buffer 220.

Graphics subsystem 200 implements high performance Open GL graphics processing, wherein typically, most of the actual rendering computation is performed by a graphics subsystem 200 as opposed to the CPU subsystem of the computer. The primitives describing the 3D object are either processed by the processor subsystem and sent to the graphics subsystem for rendering, and arrive via busses 201 and 202, or alternatively they can be requested by the graphics subsystem directly from sections of memory. For example, a 3D model of an object is sent to the graphics subsystem 200 as contiguous strips of triangles or polygons along with other graphics data (e.g., primitives, rendering commands, instructions, etc.). This data stream provides the components 210–216 of graphics subsystem 200 with all the information required to render the 3D object and the resulting scene. Such information includes, for example, specular highlighting, anti-aliasing, depth, transparency, and the like. Using this information, components 210–216 perform the computational processing required to realistically render the 3D object into frame buffer 220.

It should be appreciated that, for ease of clarification and understanding, in the forthcoming paragraphs pertaining to objects in a design 401, 601, 701, 801, 901, and 1001 contained within the following figures, only one dimensional objects were used as examples in the associated and described figures. This should not be considered a limitation of the present embodiment of the present invention. In fact, the object in a design may take most forms or shapes, either of a known standard geometric shape, such as a rectangle or circle, or a free form shape, such as a bounding box or an envelope that represents the entire component, (object) in a design. Further, the object in a design may be configured as a one, two, or three dimensional figure that may be rotated about most axis, and manipulated from most reference points contained within that object. Additionally, the object in a design may be referenced against most defining planes implemented as a boundary for that object with respect to the design.

It should further be appreciated that in the forthcoming descriptions of the following figures of the current embodiment of the present invention, the millimeter, or an estimation thereof, is utilized as an exampled unit of linear measurement to represent distance and spatial relationships between objects in a design. This unit of measurement should not be construed as a limitation to the invention. Almost all units of measurement may be implemented, be they linear, magnetic, electrical, heat, and so on. The units of measurement may range from the very small nanofarads to the very large light year, and may also be of other known and not so well known means of representing a distance or value.

Figure 3A:
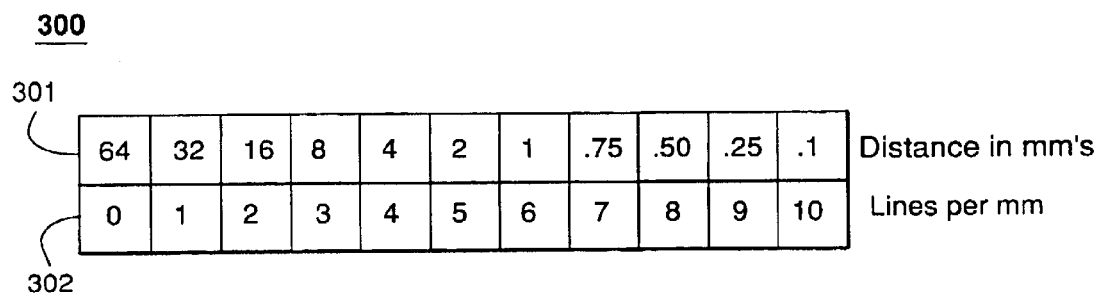
FIG. 3A is an illustration of a scalar bar chart, in accordance with one embodiment of the present invention.
Figure 4A:
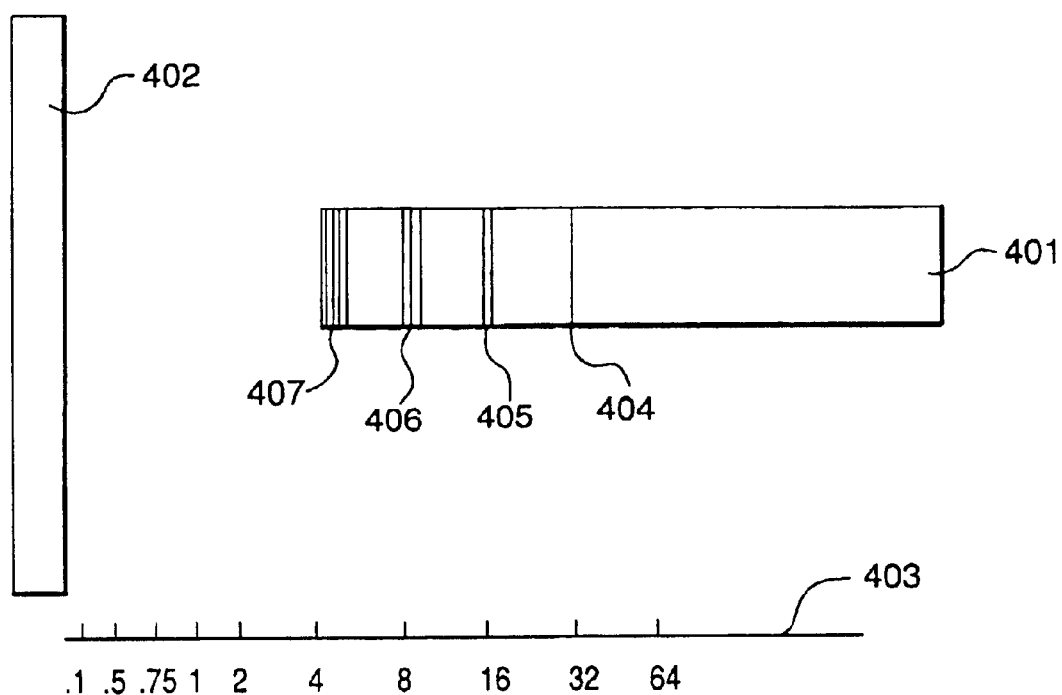
FIG. 4A is an illustration of an object disposed an interpreted distance from a defining plane, using the scalar value as depicted in FIGS. 3A and 3B, in accordance with one embodiment of the present invention.
Figure 4B:
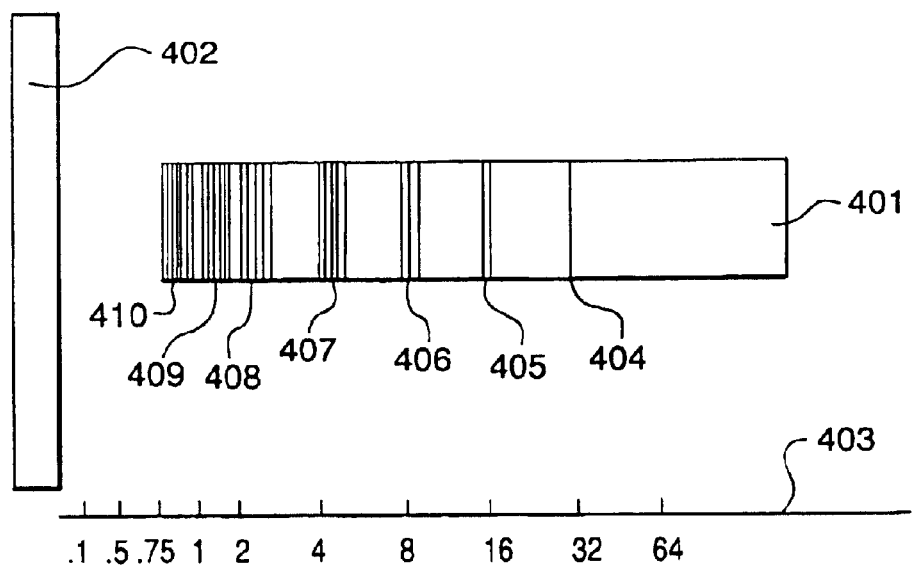
FIG. 4B is an illustration of the object in FIG. 4A interpreted less distant from the defining plane, using the scalar value as depicted in FIGS. 3A and 3B, in accordance with one embodiment of the present invention.

With reference now to FIG. 3A, shown is scalar value chart 300 implemented for the textures shown in FIGS. 4A and 4B. Top line 301 of the chart is the distance in millimeters that the leading edge of the object in a design is disposed from the defining plane. Bottom line 302 of the chart is the corresponding number of lines associated with the distance from the defining plane that the object is disposed. In this embodiment of the present invention, the texture is configured as lines of contour, such that as the object's proximity to the defining plane increases, the contour lines, as determined by the scalar value chart 300, visually indicate that distance from the defining plane. Thus, as the object draws nearer to the defining plane, the number of contour lines increases.

Figure 3B:
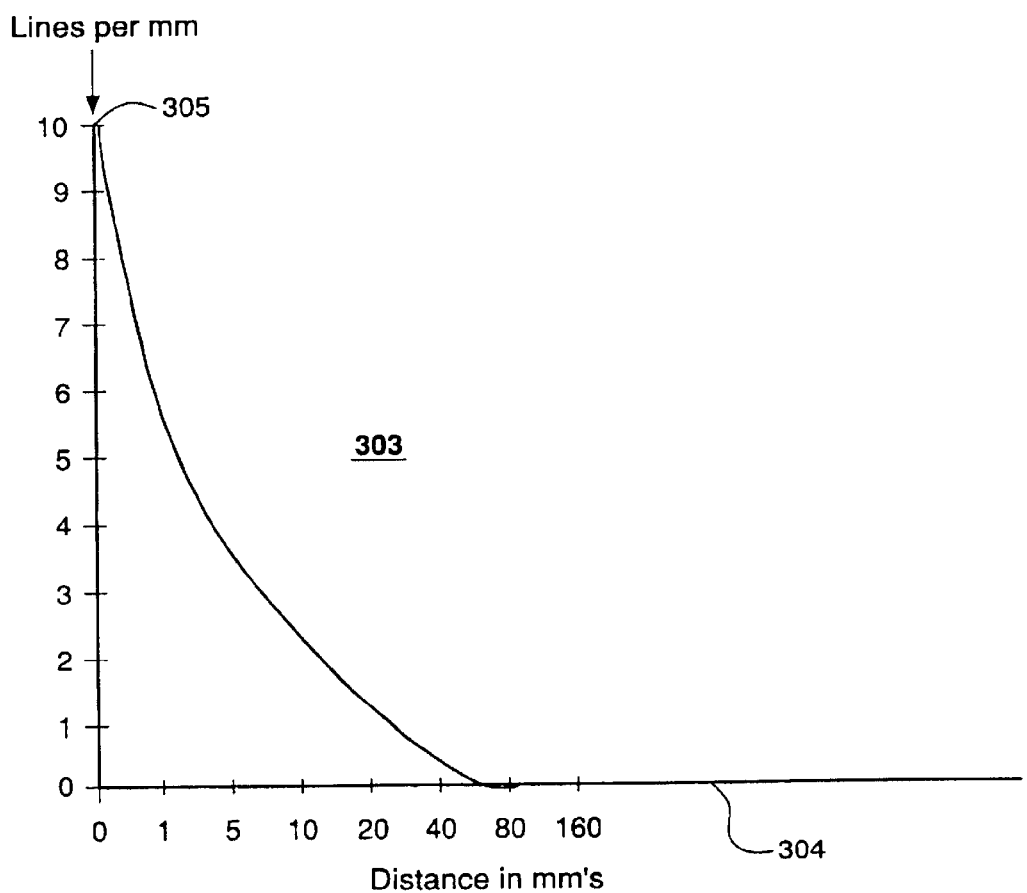
FIG. 3B is an illustration of a graph equivalent of the scalar bar chart of FIG. 3A, in accordance with one embodiment of the present invention.

With reference to FIG. 3B, shown is an illustration of scalar value graph 303 representative of the values described in scalar value chart 300 of FIG. 3A. Horizontal axis 304 is representative of the distance in millimeters that the object in a design is from the defining plane. Vertical axis 305 is representative of the number of contour lines associated with the proximity of the object to the defining plane. As previously stated, when the object's distance to the defining plane decreases the number of contour lines increases, indicative of an increase in the proximity.

Now referring to FIGS. 4A and 4B, shown is an object in a design in varying distances from a defining plane in one embodiment of the present invention. FIG. 4A, oriented toward the top of the page, illustrates object in a design 401 as having its leading edge approximately four millimeters from defining plane 402, as determined by interpretation of distance bar 403. As such, by utilizing scalar value chart 300 of FIG. 3A, the texture generating apparatus generates the appropriate number of lines of contour onto object in a design 401 to depict the distance from defining plane 402 that object in a design 401 is disposed. In the current example, the distance of the leading edge of object 401 is approximately 4 millimeters, as determined by interpretation of distance bar 403, the apparatus has rendered onto object 401 contour lines 407, which is comprised of four lines of contour. Shown also in FIG. 4A, as determined by interpretation of distance bar 403, approximately at the 8 millimeter distance, is rendered contour lines 406, which is comprised of three lines of contour. Further, at approximately the 16 millimeter distance, as determined by interpretation of distance bar 403, rendered are contour lines 405, which is comprised of two lines of contour. At approximately the 32 millimeter distance, also as determined by interpretation of distance bar 403, rendered is contour line 404, which is comprised of one line of contour. Since object in a design 401 has portions thereof that are not within the predetermined range of distances, no texture contour has been applied to those areas disposed right of contour line 404.

Now referring to FIG. 4B, disposed toward the bottom of the page, shown is object in a design 401, analogous to object 401 of FIG. 4A. Now positioned closer to defining plane 402, the distance of the leading edge of object in a design 401 to defining plane 402 is now approximately 0.75 millimeters, as determined by interpretation of distance bar 403, and by utilizing scalar value chart 300 of FIG. 3A, the texture generating apparatus has rendered onto object in a design 401 contour lines 410, which is comprised of seven lines of contour. Shown at approximately the 1 millimeter distance are lines of contour 409, as determined by interpretation of distance bar 403, which is comprised of six lines of contour. Also, shown at approximately the 2 millimeter distance are lines of contour 408, as determined by interpretation of distance bar 403, which is comprised of five lines of contour. Lines of contour 404–407 of object in a design 401 of FIG. 4B is analogous to lines of contour 404–407 as described in FIG. 4A. Furthermore, even though object in a design 401 has been somewhat repositioned with regard to defining plane 402, object in a design 401 still has portions thereof that are not within the predetermined range of distances and, as such, no lines of contour have been applied to those areas of object in design 401 that are disposed right of contour line 404.

It should be appreciated that while object in a design 401 was actively being repositioned from its original orientation as described in FIG. 4A to the new position as described in FIG. 4B, the texture generating apparatus was, as object 401 was drawing closer to defining plane 402, dynamically rendering the lines of contour, those lines of contour reflective of the decreasing distance between the leading edge of object in a design 401 and defining plane 402, in accordance with one embodiment of the present invention.

Figures 5A, 5B:
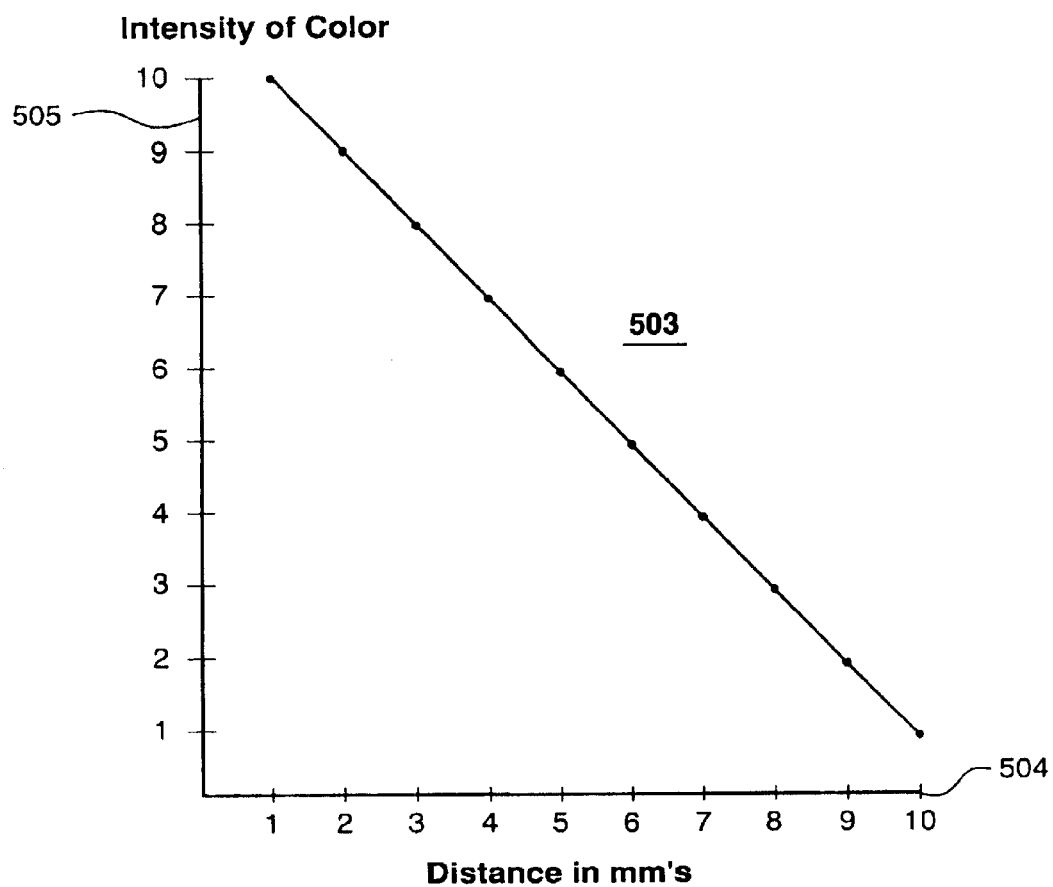
FIG. 5A is an illustration of a scalar value bar chart, in accordance with one embodiment of the present invention.
FIG. 5B is an illustration of a graph equivalent of the scalar value bar chart of FIG. 5A, in accordance with one embodiment of the present invention.
Figure 6A:
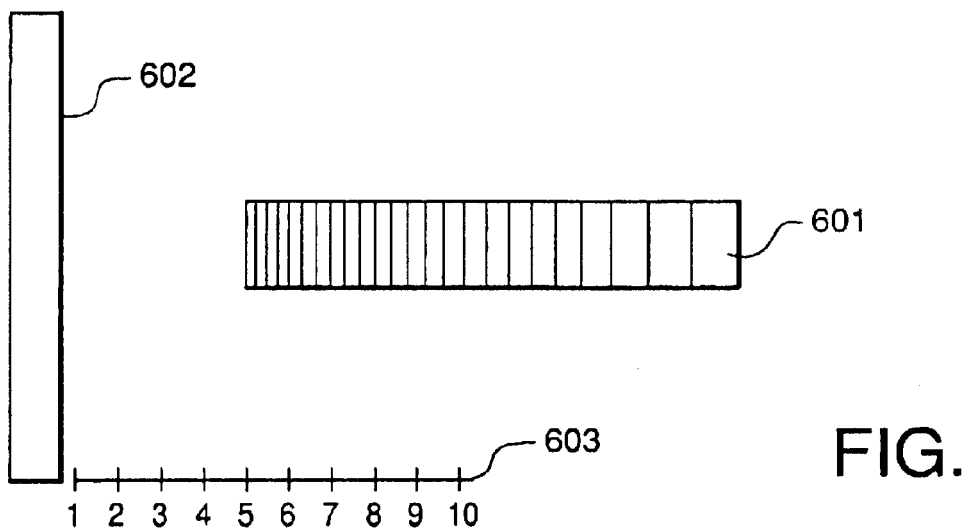
FIG. 6A is an illustration of an object in an interpreted distance from a defining plane, using the scalar value of FIGS. 5A and 5B, in accordance with one embodiment of the present invention.
Figure 6B:
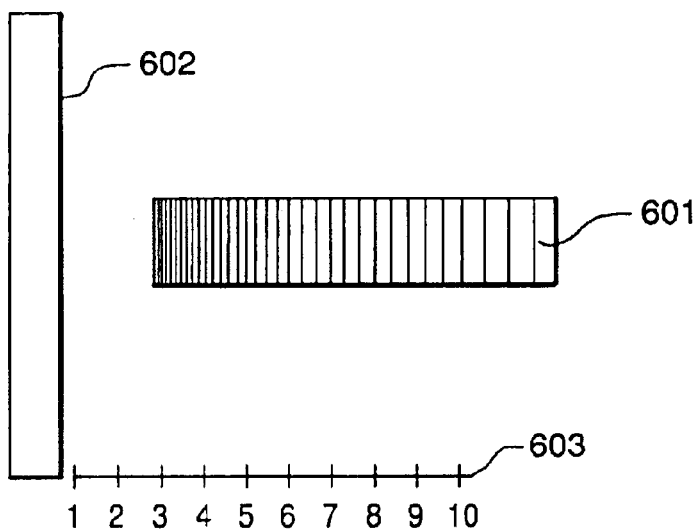
FIG. 6B is an illustration of the object in FIG. 6A interpreted less distant from the defining plane, in accordance with one embodiment of the present invention.

With reference now to FIG. 5A, shown is scalar value chart 500 implemented for the generated textures shown in FIGS. 6A and 6B. Top line 501 of chart 500 is the distance in millimeters that the leading edge of the object in a design is disposed from the defining plane. Bottom line 502 of chart 500 is the corresponding intensity of color associated with the distance from the defining plane that the object is disposed. In this embodiment of the present invention, the texture is configured as a single color, such that as the object's proximity to the defining plane increases, the intensity of the color increases, as determined by the scalar value chart 500, visually indicating that distance from the defining plane. Thus, as the object draws nearer to the defining plane, the intensity of the color increases.

With reference to FIG. 5B, shown is an illustration of scalar value graph 503, representative of the values described in scalar value chart 500 of FIG. 5A. Horizontal axis 504 is representative of the distance in millimeters that the object in a design is from the defining plane. Vertical axis 505 is representative of the intensity of the color associated with the proximity of the object to the defining plane. As previously stated, when the object's distance to the defining plane decreases the intensity of the color increases, indicative of an increase in the proximity.

Figure 6C:
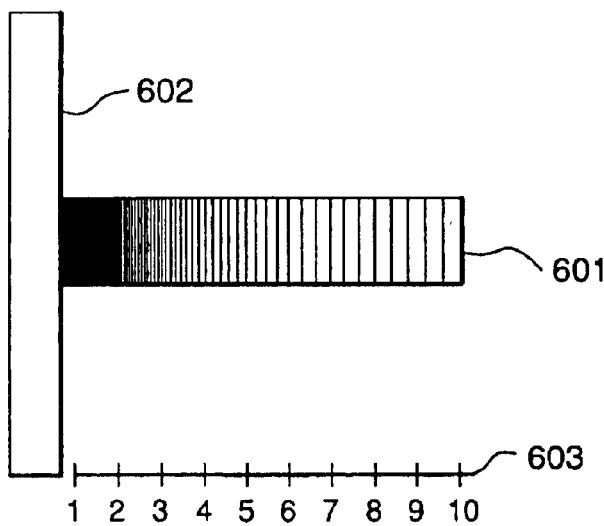
FIG. 6C is an illustration of the object in FIG. 6B interpreted less distant from the defining plane, in accordance with one embodiment of the present invention.

Now referring to FIGS. 6A, 6B, and 6C, shown is an object in a design in varying distances from a defining plane in one embodiment of the present invention. FIG. 6A, oriented toward the top of the page, illustrates object in a design 601 as having its leading edge approximately five millimeters from defining plane 602, as determined by interpretation of distance bar 603. As such, by utilizing scalar value chart 500 of FIG. 5A, the texture generating apparatus generates the appropriate color intensity onto object in a design 601 to depict the distance from defining plane 602 that object in a design 601 is disposed. In the current example, the distance of the leading edge of object 601 from defining plane 602 is approximately 5 millimeters, as determined by interpretation of distance bar 603. Therefore, the texture generating apparatus has rendered onto object 601, by interpretation of scalar value chart 500 of FIG. 5A, a color intensity of 6. Also depicted in FIG. 6A is the representation that the color intensity decreases from a level of 6 at approximately 5 millimeters to being non-colored as the remaining surface area of object in a design 601 is further away to the point of no longer being with the specified range of scalar value chart 500 of FIG. 5A.

Referring now to FIG. 6A, oriented toward the middle of the page, is an illustration of object in a design 601 as having its leading edge approximately 3 millimeters from defining plane 602, as determined by interpretation of distance bar 603. As such, by utilizing scalar value chart 500 of FIG. 5A, the texture generating apparatus generates the appropriate color intensity onto object in a design 601 to depict the distance from defining plane 602 that object in a design 601 is disposed. In the current example, because the distance of the leading edge of object 601 from defining plane 602 is approximately 3 millimeters, as determined by interpretation of distance bar 603, the texture generating apparatus has rendered onto object 601, by interpretation of scalar value chart 500 of FIG. 5A, a color intensity of 8. Also depicted in FIG. 6B is the representation that the color intensity decreases from a level of 8 at approximately 3 millimeters to being non-colored as the remaining surface area of object in a design 601 is further away from defining plane 602 to the point of no longer being with the specified range of scalar value chart 500 of FIG. 5A.

Now with reference to FIG. 6C, oriented toward the bottom of the page, shown is an illustration of object in a design 601 as having its leading edge approximately 1 millimeter from defining plane 602, as determined by interpretation of distance bar 603. As such, by utilizing scalar value chart 500 of FIG. 5A, the texture generating apparatus generates the appropriate color. intensity onto object in a design 601 to depict the distance from defining plane 602 that object in a design 601 is disposed. In the current example, the distance of the leading edge of object 601 from defining plane 602 is approximately 1 millimeter, as determined by interpretation of distance bar 603. Therefore, the texture generating apparatus has rendered onto object 601, by interpretation of scalar value chart 500 of FIG. 5A, a color intensity of 10. Also depicted in FIG. 6A is the representation that the color intensity decreases from a level of 10 at approximately 1 millimeter to a color intensity level of 1 at approximately 10 millimeters, caused by object in a design 601, in its entirety, being disposed within the range determined by scalar value chart 500 in FIG. 5A.

It should be appreciated that while object in a design 601 was actively being repositioned from its original orientation as described in FIG. 6A to another position as described in FIG. 6B, and then to the final orientation as described in FIG. 6C, the texture generating apparatus was, as object 601 was drawing closer to defining plane 602, dynamically rendering the increasing levels of color intensity onto the object in a design, those increasing levels of color intensity reflective of the decreasing distance between the leading edge of object in a design 601 and defining plane 602, in accordance with one embodiment of the present invention.

Figure 7A:
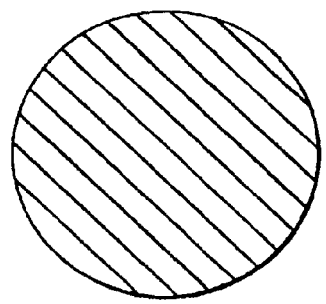
FIG. 7A is an illustration of a color key representing the color green that will be used in the following drawings to further represent the functionality of the preferred embodiment, in accordance with one embodiment of the present invention.
Figure 7B:
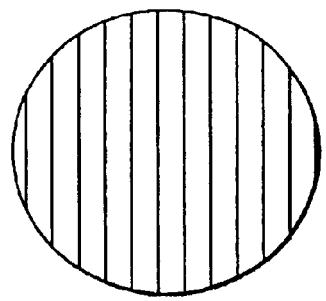
FIG. 7B is an illustration of a color key representing the color red that will be used in the following drawings to further represent the functionality of the preferred embodiment, in accordance with one embodiment of the present invention.
Figure 7C:
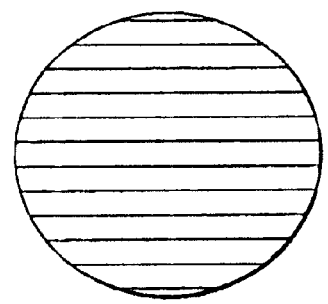
FIG. 7C is an illustration of a color key representing the color blue that will be used in the following drawings to further represent the functionality of the preferred embodiment, in accordance with one embodiment of the present invention.
Figure 7D:
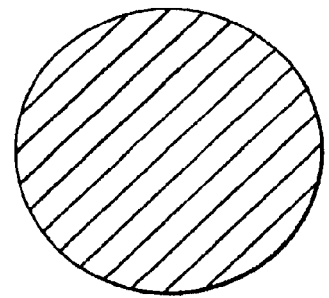
FIG. 7D is an illustration of a color key representing the color brown that will be used in the following drawings to further represent the functionality of the preferred embodiment, in accordance with one embodiment of the present invention.
Figure 7E:
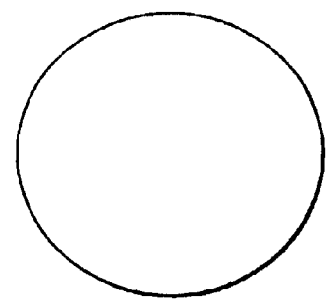
FIG. 7E is an illustration of a color key representing having no color that will be used in the following drawings to further represent the functionality of the preferred embodiment, in accordance with one embodiment of the present invention.
Figure 7F:
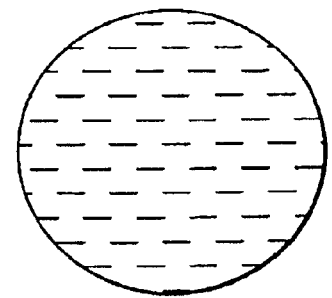
FIG. 7F is an illustration of a color key representing the color gray that will be used in the following drawings to further represent the functionality of the preferred embodiment, in accordance with one embodiment of the present invention.

With reference now to FIGS. 7A–7F, shown are six illustrations which represent the color key which is to be applied to forthcoming FIGS. 8A–8C, 9A–9C, and 10A–10C. Starting in the upper left corner, shown is FIG. 7A comprising of diagonal lines commencing from upper left downward toward lower right. FIG. 7A represents the color green. In the upper right corner, shown is FIG. 7B comprising vertical lines which represent the color red. In the middle left, shown is FIG. 7C, comprising horizontal lines, which represents the color blue. In the middle right, shown is FIG. 7D, comprising diagonal lines commencing from upper right downward toward lower left, which represents the color brown. In the lower left, shown is FIG. 7E, comprising no indications, which represents no color. In the bottom right, shown is FIG. 7F, comprising a dashed horizontal lines, which represents the color gray. It should be appreciated that in the forthcoming drawings, the color green will indicate when the object in a design is within certain scalar value parameters regarding the spatial relationship between the object in a design and the defining plane. Further, the color red will indicate when the object in a design has been positioned such that it interferes with the defining plane.

Figure 8A:
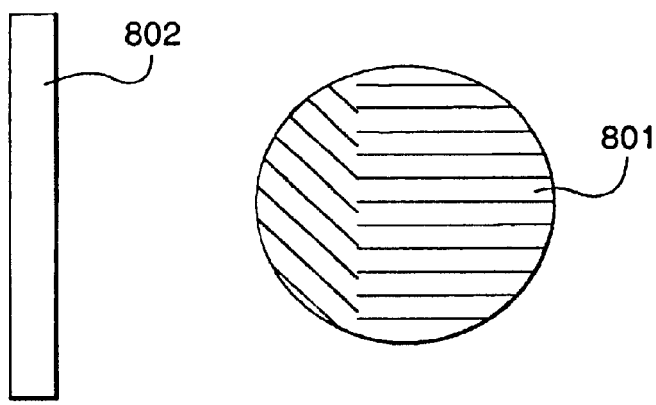
FIG. 8A is an illustration of an object a distance from a defining plane, in accordance with one embodiment of the present invention.
Figure 8B:
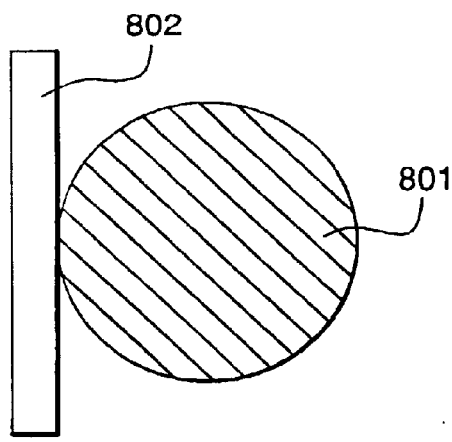
FIG. 8B is an illustration of the object of FIG. 8A less distant from the defining plane, in accordance with one embodiment of the present invention.
Figure 8C:
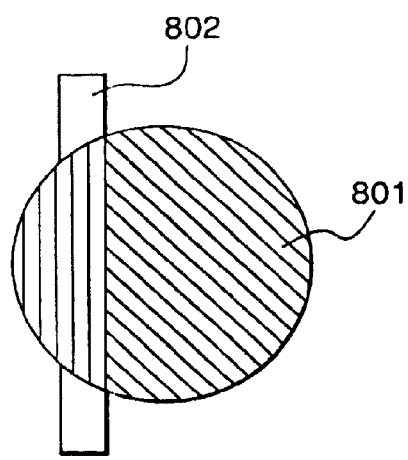
FIG. 8C is an illustration of the object of FIG. 8B less distant from the defining plane, in accordance with one embodiment of the present invention.

Now referring to FIGS. 8A–8C, shown is object in a design 801 in varying distanced orientation relative to defining plane 802. In FIG. 8A, shown is object in a design 801 at a distance from defining plane 802 such that only the left most portion of object 801 is depicted as oriented within a determined scalar value range and is therefore represented by the color green. In this example of the current invention, the remaining portion of object in a design 801 is colored blue, indicating that it is neither within the determined scalar value range nor is it interfering with the defining plane.

With reference now to FIG. 8B, shown is object in a design 801 properly oriented with regard to the determined spatial relationship between object 801 and defining plane 802 and has had applied to it the color green.

Now referring to FIG. 8C, shown is object in a design 801 oriented such that part of the left side of object 801 is infringing upon defining plane 802 and is therefore colored red, indicative of the interference with defining plane 802.

It should be appreciated that while object in a design 801 was actively being repositioned from its original orientation as described in FIG. 8A to another position as described in FIG. 8B, and then to the final orientation as described in FIG. 8C, the texture generating apparatus was, as object 801 was drawing closer to and eventually overlapping defining plane 802, dynamically rendering the changes in color from blue, which indicates a distance not within determined parameters, to green indicating proper orientation regarding the spatial relationship between object 801 and defining plane 802, to a red color when object 801 interfered with defining plane 802, onto object in a design 801, those changes of color reflective of the reorientation of object in a design 801 with regard to defining plane 802, in accordance with one embodiment of the present invention.

Figure 9A:
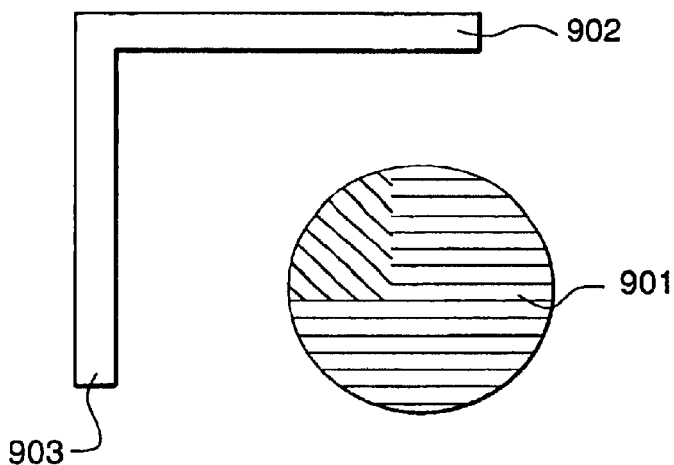
FIG. 9A is an illustration of an object a distance from two defining planes, in accordance with one embodiment of the present invention.
Figure 9B:
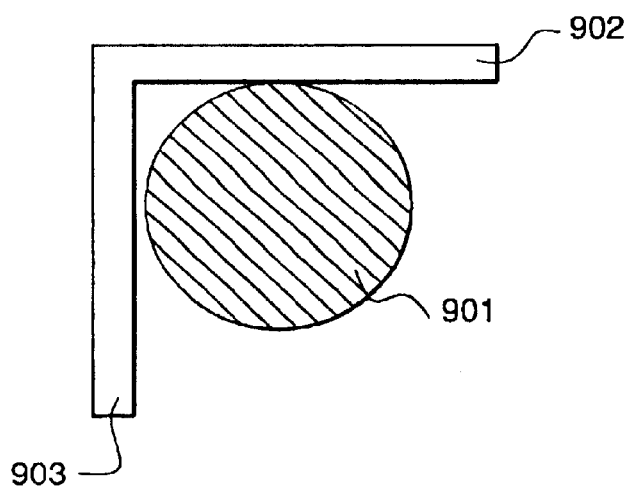
FIG. 9B is an illustration of the object of FIG. 9A less distant from the two defining planes, in accordance with one embodiment of the present invention.
Figure 9C:
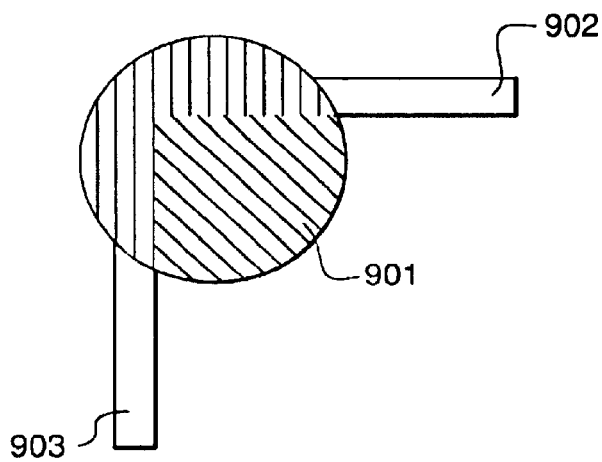
FIG. 9C is an illustration of the object in FIG. 9B less distant from the two defining planes, in accordance with one embodiment of the present invention.

Now referring to FIGS. 9A–9C, shown is object in a design 901 in varying distanced orientation relative to horizontal defining plane 902 and vertical defining plane 903. In FIG. 9A, shown is object in a design 901 at a distance from defining planes 902 and 903 such that only the upper left most portion of object 901 is depicted as oriented within a determined scalar value range and is therefore represented by the color green. In this example of the current invention, the remaining portion of object in a design 901 is colored blue, indicating that it is neither within the determined scalar value range nor is it interfering with the defining plane.

With reference now to FIG. 9B, shown is object in a design 901 properly oriented with regard to the determined spatial relationship between object 901 and defining planes 902 and 903 and has had applied to it the color green.

Now referring to FIG. 9C, shown is object in a design 901 oriented such that the left side and the top portion of object 901 are both infringing upon defining planes 902 and 903 and are therefore colored red, indicative of the interference with horizontal defining plane 902 and vertical defining plane 903.

It should be appreciated that while object in a design 901 was actively being repositioned from its original orientation as described in FIG. 9A to another position as described in FIG. 9B, and then to the final orientation as described in FIG. 9C, the texture generating apparatus was, as object 901 was drawing closer to and eventually overlapping defining planes 902 and 903, dynamically rendering the changes in color from blue, which indicates a distance not within determined scalar value parameters, to green indicating proper orientation regarding the spatial relationship between object 901 and defining planes 902 and 903, to a red color when object 901 interfered with defining planes 902 and 903, onto object in a design 901, those changes of color reflective of the reorientation of object in a design 901 with regard to horizontal defining plane 902 and vertical defining plane 903, in accordance with one embodiment of the present invention.

Figure 10A:
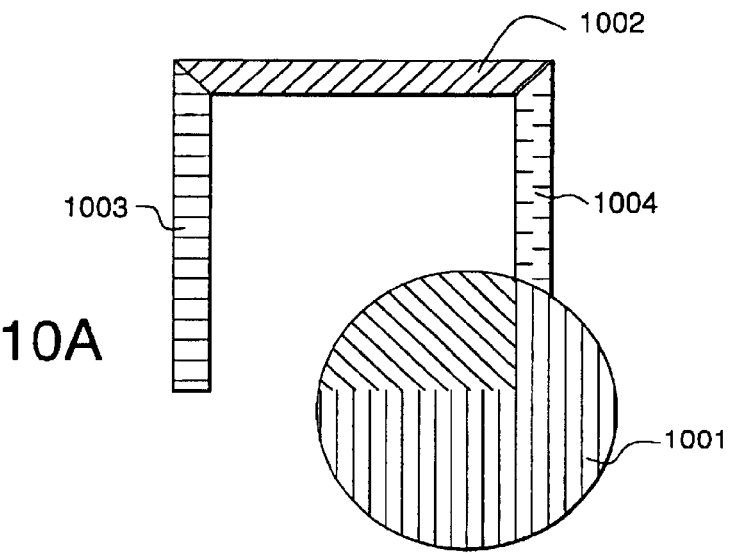
FIG. 10A is an illustration of an object a distance from three defining planes, in accordance with one embodiment of the present invention.
Figure 10B:
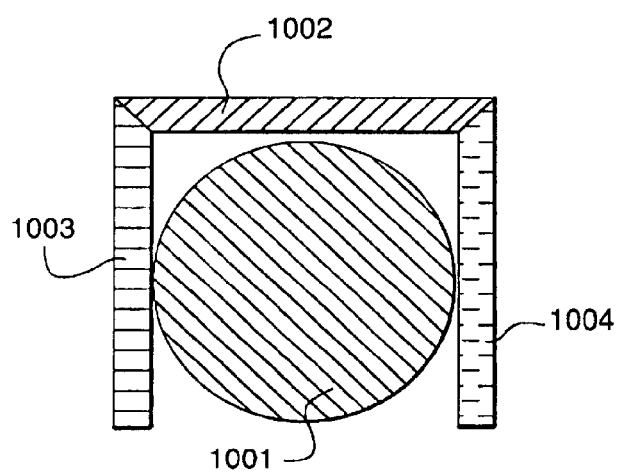
FIG. 10B is an illustration of the object of FIG. 10A less distant from three defining planes, in accordance with one embodiment of the present invention.
Figure 10C:
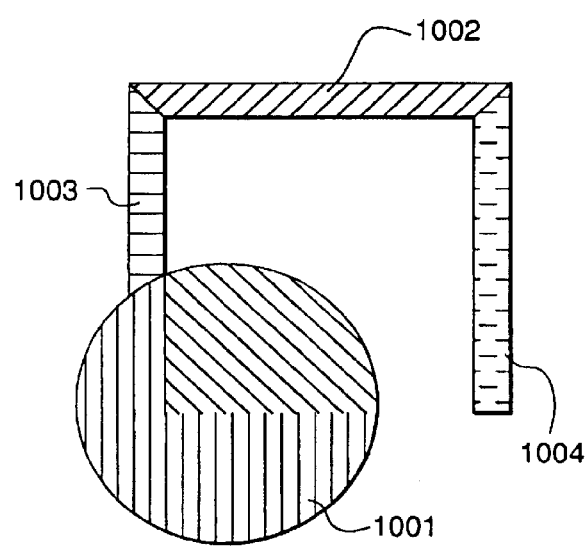
FIG. 10C is an illustration of the object in FIG. 10B less distant from three defining planes, in accordance with one embodiment of the present invention.

Now referring to FIGS. 10A–10C, shown is object in a design 1001 in varying distanced orientation relative to horizontal defining plane 1002, left vertical defining plane 1003 and right vertical defining plane 1004. In FIG. 10A, shown is object in a design 1001 oriented to the right of and at a distance from defining planes 1002, 1003 and 1004 such that, only the upper left and upper middle portions of object 1001 are depicted as oriented within the determined scalar value range and is therefore represented by the color green. In this example of the current invention, all portions of object in a design 1001 that are not within the scalar value parameters regarding the spatial relationship between the object and the defining planes are considered to be an interference, and as such, the remaining portion of object in a design 1001 is colored red.

With reference now to FIG. 10B, shown is object in a design 1001 properly oriented with regard to the determined spatial relationship between object 1001 and defining planes 1002, 1003, and 1004, and has had applied to it the color green.

Now referring to FIG. 10C, shown is object in a design 1001 oriented such that the left side of object 1001 is infringing upon left vertical defining plane 1003 and the bottom portion of object 1001 is not within the determined scalar value parameters, and as such, are therefore colored red.

It should be appreciated that while object in a design 1001 was actively being repositioned from its original orientation as described in FIG. 10A to another position as described in FIG. 10B, and then to the final orientation as described in FIG. 10C, the texture generating apparatus was dynamically rendering the changes in color onto object in design 1001, those changes of color reflective of the reorientation of object in a design 1001 with regard to horizontal defining plane 1002, left vertical defining plane 1003, and right vertical defining plane 1004, in accordance with one embodiment of the present invention.

It should also be appreciated that, in one embodiment of the present invention, the texture having a gradation applied to the objects in a design in the above detailed description was generated up front, meaning prior to performing the interference check. It should be further appreciated that, in another embodiment of the present invention, the texture having a gradation may be applied on a per frame basis upon the objects in a design. It should be even further appreciated, in another embodiment of the present invention that an alternative texture having a gradation may be dynamically applied on a per frame basis during repositioning of the first object relative to the second object.

Figure 11:
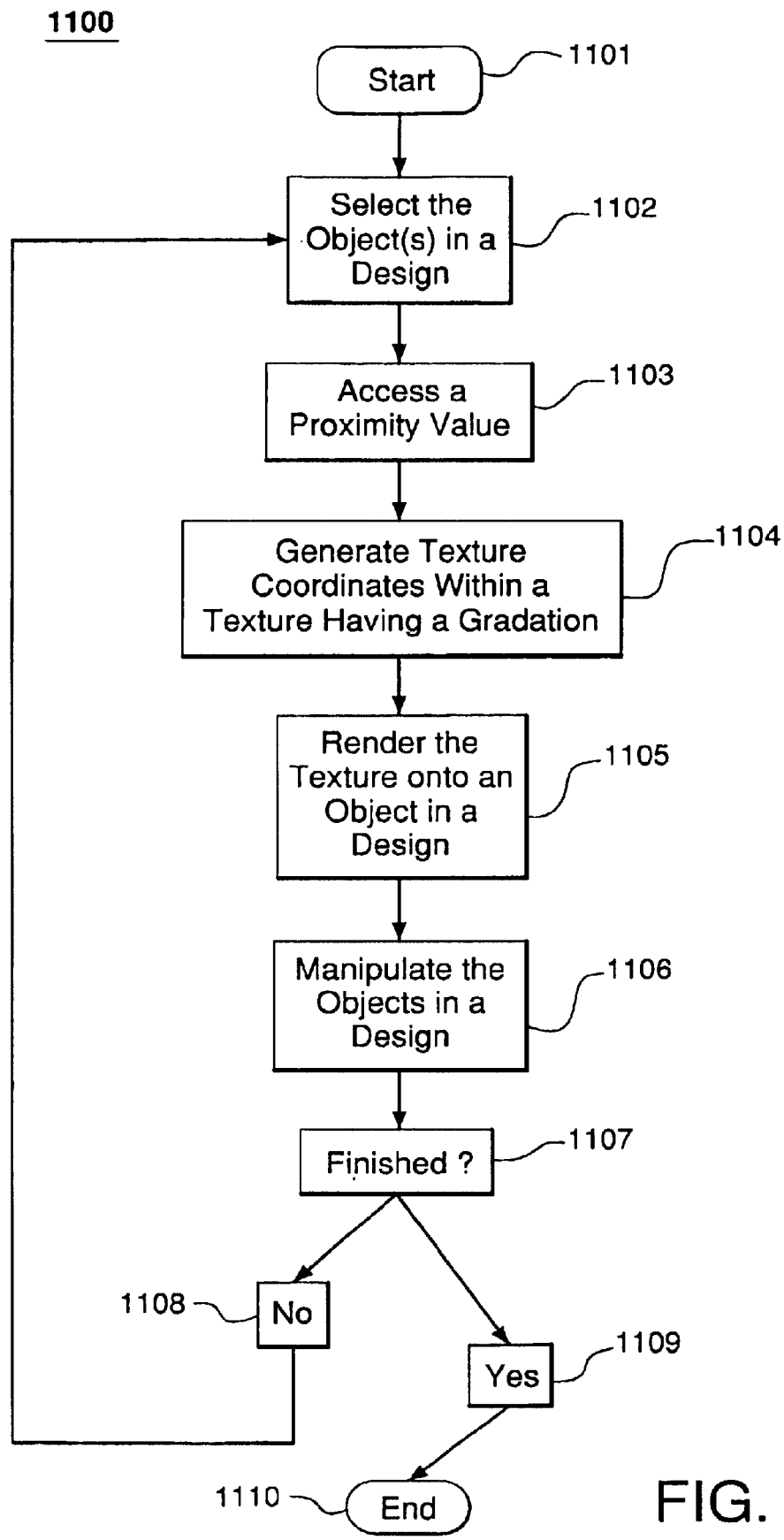
FIG. 11 is a flowchart showing the steps in a process 1100 for utilizing a texture generating apparatus, in accordance with one embodiment of the present invention.

With reference now to FIG. 11, depicted is a flowchart which shows the steps of process 1100 for utilizing the texture generating apparatus to perform dynamic proximity analysis, in accordance with one embodiment of the present invention.

In step 1102 of FIG. 11, in the present embodiment, the designer, engineer, or teams thereof, select the objects in a design on which they desire to perform the proximity analysis. The objects in a design are comprised of a first and second object wherein one object is a component in a design and the other object is a plane having a defined boundary with regard to the other object.

In step 1103 of FIG. 11, in the present embodiment, a user accesses a proximity value which is comprised of, for example, a scalar value such as that shown in scalar value charts 300 and 500 as described in FIGS. 3A and 5A. By accessing this value, a user provides a value with which to use for the interpretation of spatial relationship between the modeled objects and the defining planes.

In step 1104 of FIG. 11, in the present embodiment, a user utilizes the texture generating apparatus to generate texture coordinates within a texture having a gradation reflective of the scalar value previously accessed.

In step 1105 of FIG. 11, in the present invention, a user then renders onto the object in a design the texture having a gradation, so as to enable the user to visually interpret the spatial relationship between the objects in a design.

In step 1106 of FIG. 11, in the present invention, a user manipulates the objects in a design to coincide with their specific requirements regarding the performing of the proximity analysis. The texture generating apparatus enables the user to reorient the objects such that while the object in a design is being repositioned, the texture rendered onto the object is dynamically reflective of the alteration of the spatial relationship between the objects in a design.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A texture generating apparatus, configured in a CAD (computer aided design) adapted computer graphic system, adapted to provide proximity analysis of objects in a design by generating, manipulating and applying a texture visually indicating the spatial relationship between the modeled objects, the texture generating apparatus comprising:

a) a processing portion adapted to perform calculations of the proximity analysis;

b) a texture coordinates generator portion coupled to said processing portion adapted to provide coordinates relating the texture to be rendered onto the objects in a the design; and c) a rendering portion coupled to said texture coordinates generator adapted to provide renderability of the texture onto the objects in a the design, and wherein the texture generator is adapted to provide a gradation corresponding to the spatial relationship of the component of a design and a defined plane based on said calculations.

2. A texture generating apparatus, configured in a CAD (computer aided design) adapted computer graphic system, adapted to provide proximity analysis of objects in a design by generating, manipulating and applying a texture visually indicating the spatial relationship between the modeled objects, the texture generating apparatus comprising:

a) a processing portion adapted to perform calculations of the proximity analysis;

b) a texture coordinates generator portion coupled to said processing portion adapted to provide coordinates relating the texture to be rendered onto the objects in a the design; and c) a rendering portion coupled to said texture coordinates generator adapted to provide renderability of the texture onto the objects in a the design, and wherein the rendering portion is adapted to render the texture onto the first object such that the gradation indicates the spatial relationship of the first object and the second object as reflected in said calculations.

3. A texture generating apparatus, configured in a CAD (computer aided design) adapted computer graphic system, adapted to provide proximity analysis of objects in a design by generating, manipulating and applying a texture visually indicating the spatial relationship between the modeled objects, the texture generating apparatus comprising:

a) a processing portion adapted to perform calculations of the proximity analysis;

b) a texture coordinates generator portion coupled to said processing portion adapted to provide coordinates relating the texture to be rendered onto the objects in a the design; and c) a rendering portion coupled to said texture coordinates generator adapted to provide renderability of the texture onto the objects in a the design, and wherein the texture generator is further adapted to enable a user to reposition the first object such that the texture and the gradation thereof rendered upon the first object is reflective of the altered spatial relationship between the first object and the second object during and following the repositioning as reflected in said calculations.

4. A texture generating apparatus, configured in a CAD (computer aided design) adapted computer graphic system, adapted to provide proximity analysis of objects in a design by generating, manipulating and applying a texture visually indicating the spatial relationship between the modeled objects, the texture generating apparatus comprising:

a) a processing portion adapted to perform calculations of the proximity analysis;

b) a texture coordinates generator portion coupled to said processing portion adapted to provide coordinates relating the texture to be rendered onto the objects in a the design; and c) a rendering portion coupled to said texture coordinates generator adapted to provide renderability of the texture onto the objects in a the design, and wherein the texture generator is further adapted to generate a renderable texture so as to enable a user to apply the texture having a gradation on a per frame basis upon the objects in a design.

5. A texture generating apparatus, configured in a CAD (computer aided design) adapted computer graphic system, adapted to provide proximity analysis of objects in a design by generating, manipulating and applying a texture visually indicating the spatial relationship between the modeled objects, the texture generating apparatus comprising:

a) a processing portion adapted to perform calculations of the proximity analysis;

b) a texture coordinates generator portion coupled to said processing portion adapted to provide coordinates relating the texture to be rendered onto the objects in a the design; and c) a rendering portion coupled to said texture coordinates generator adapted to provide renderability of the texture onto the objects in a the design, and wherein the texture generator is further adapted to generate a renderable texture so as to enable a user to dynamically apply an alternative texture having a gradation on a per frame basis during repositioning of the first object relative to the second object.

6. In a CAD (computer aided design) system for performing proximity analysis of objects in a design, a method for visually indicating the spatial relationship between modeled objects, comprising the steps of:

(a) accessing a proximity value characterizing a spatial relationship between a first object and a second object;

(b) generating a texture having a gradation corresponding to the proximity value, the generating performed by a texture generator coupled to receive the proximity value;

(c) rendering the texture onto the first object such that the gradation indicates the spatial relationship of the first object and the second object;

(d) displaying the first object and the second object using a display such that the texture and the gradation rendered onto the first object visually indicates the spatial relationship between the first object and the second object; and (e) repositioning the first object such that the texture and the gradation thereof rendered upon the fist object is reflective of the altered spatial relationship between the first object and the second object during and following the repositioning.

7. The method of claim 6 wherein the gradation is used to implement visual contours on the first object corresponding to a distance from the second object.

8. The method of claim 6 wherein the gradation is used to implement visual colors on the first object corresponding to a distance from the second object.

9. The method of claim 6 wherein the first object is a component of a design and the second object is a defined plane.

10. The method of claim 6 wherein the first object is a defined plane and the second object is a component of a design.

11. The method of claim 6 wherein the plane is a defined boundary for the component with respect to the design.

* * * * *